(12) United States Patent
Kilian et al.

(10) Patent No.: US 7,647,842 B1
(45) Date of Patent: Jan. 19, 2010

(54) PRESSURE-BASED FLUID FLOW SENSOR (75) Inventors: Wayne Kilian, Richardson, TX (US);
Scott Edward Beck, Murphy, TX (US);
Gilberto Morales, Arlington, TX (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/180,070

(22) Filed: Jul. 25, 2008

(51) Int. Cl.
*G01F 1/38* (2006.01)
(52) U.S. Cl. .................................... 73/861.47
(58) Field of Classification Search .. 73/861.42–861.47
See application file for complete search history.

(56) References Cited

U.S. PATENT DOCUMENTS

| | | | |
|---|---|---|---|
| 3,893,228 A | 7/1975 | George et al. | |
| 4,478,076 A | 10/1984 | Bohrer | |
| 4,478,077 A | 10/1984 | Bohrer et al. | |
| 4,501,144 A | 2/1985 | Higashi et al. | |
| 4,548,078 A | 10/1985 | Bohrer et al. | |
| 4,651,564 A | 3/1987 | Johnson et al. | |
| 4,682,503 A | 7/1987 | Higashi et al. | |
| 4,914,742 A | 4/1990 | Higashi et al. | |
| 6,003,384 A * | 12/1999 | Frohlich et al. | 73/861.22 |
| 6,150,681 A | 11/2000 | Allen | |
| 6,253,605 B1 | 7/2001 | Richter | |
| 6,871,537 B1 | 3/2005 | Gehman et al. | |
| 2005/0126281 A1 | 6/2005 | Blakley et al. | |

* cited by examiner

*Primary Examiner*—Jewel Thompson
(74) *Attorney, Agent, or Firm*—Patents on Demand, P.A.; Neil R. Jetter (57) ABSTRACT

A volumetric fluid flow sensor (100) includes a flow channel (120) for flowing a fluid therein; and a diaphragm (110) having an outer surface within the flow channel (120). The diaphragm (110) includes at least one flow disrupting feature mechanically coupled to or emerging from the outer surface of the diaphragm (110). A sensing structure (126) is coupled to the diaphragm (110) for generating a sensing signal responsive to a pressure signal on the diaphragm (110).

14 Claims, 10 Drawing Sheets

PRESSURE-BASED FLUID FLOW SENSOR

FIELD OF THE INVENTION

Embodiments of the present invention relate to diaphragm-based fluid flow sensors.

BACKGROUND

Both gas and liquid flow can be measured in volumetric or mass flow rates (such as liters per second or kg/s). These measurements can be converted between one another if the density of the material is known. However, the density of the material is not always known, such as in the case the composition of the fluid is unknown.

Volumetric flow sensors can be embodied as mechanical flow meters including rotometers and pith-ball indicators. Such mechanical flow meters are relatively large mechanical assemblies. Monolithic volumetric flow sensors are available that create a pressure differential from fluid flow normal to a planar stress-gauge diaphragm with a hole in it. Such a sensor, commonly referred to as an orifice plate, is placed in the flow and constricts the flow. Monolithic volumetric flow sensors use the same principle as the venturi meter in that the differential pressure relates to the velocity of the fluid flow (Bernoulli's principle).

Other devices for volumetric flow sensing are based on various configurations for sensing a flow-induced pressure differential. Well known microbridge structures achieve tangential sensing of mass flow only, require a well controlled heater for accuracy, and because of the heater, operate at higher levels of power dissipation. What is needed is new flow sensing devices having reduced complexity for lower cost and/or more robust designs.

SUMMARY

This Summary is provided to comply with 37 C.F.R. §1.73, presenting a summary of the invention briefly indicating the nature and substance of the invention. It is submitted with the understanding that it will not be used to interpret or limit the scope or meaning of the claims.

A volumetric fluid flow sensor according to an embodiment of the invention comprises a flow channel for flowing a fluid therein; a diaphragm having an outer surface within the flow channel, wherein the diaphragm comprises at least one flow disrupting feature mechanically coupled to or emerging from the outer surface of the diaphragm. The flow disrupting feature increases the pressure on the diaphragm compared to a conventional diaphragm which is uniformly planar. The increased pressure increases the deflection of the diaphragm and thus the available output signal provided by a sensing structure that provides an output signal based on the deflection of the diaphragm. As used herein, the term "flow disrupting feature" refers to a feature that is mechanically coupled to or emerging from the outer surface of the diaphragm that increases the pressure on the diaphragm $\geq 20\%$ at one or more diaphragm locations as compared to the pressure obtained from a conventional planar diaphragm.

A sensing structure is coupled to the flow disrupting feature. The sensing structure generates a sensing signal responsive to a pressure signal on said diaphragm. In one embodiment, the sensing structure comprises a plurality of piezoresistive elements, such as arranged in a Wheatstone bridge configuration, which produces an electrical sensing signal. The sensing signal can produce a sensing signal that is proportional or nearly proportional to the pressure on the diaphragm induced by the fluid flow.

A method for sensing volumetric flow of a fluid comprises flowing a fluid over a diaphragm having an outer surface within a flow channel, wherein the diaphragm comprises at least one flow disrupting feature mechanically coupled to or emerging from said outer surface. A sensing signal is generated responsive to a pressure signal from a portion of said diaphragm. A flow rate of the fluid is determined from the sensing signal. The flow disrupting feature can partially obstruct a flow of the fluid to create a pressure differential between opposite sides of the diaphragm, along a direction of the flow. In another embodiment, the flow disrupting feature deflects the flow of the fluid to produce a force on the diaphragm.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present Inventors have discovered that fluid flowing across the top of a pressure sensor comprising a stress sensitive diaphragm that is modified to include an attached flow disrupting, protruding feature produces a pressure on the diaphragm that is significantly enhanced (e.g. $\geq 20\%$, and typically $\geq 40\%$) as compared to the pressure provided by a conventional planar diaphragm. Depending on the geometry of the flow disrupting feature, the gas or liquid flowing around the flow disrupting feature can produce, for example: a pressure differential tangential to the diaphragm due to obstruction of the flow and thereby delivering a moment to the diaphragm, a pressure differential directed normal to the diaphragm resulting from an airfoil effect and thereby delivering a force that is normal to the diaphragm, and forces delivered to the diaphragm caused by deflection of the fluid such as that produced by an aileron, or a resultant of any combination of these effects. The pressure signal can be related to the flow rate using calibration data that can be generated empirically or by simulation.

In the case of piezoresistor-based sensing elements, these extra force-generating effects produces additional stresses on the piezoresistors which increases the output signal of the sensor. The piezoresistors can be located and oriented on the diaphragm in a manner that maximizes the output signal in response to an individual stress pattern produced by a corresponding individual flow disrupting feature shape. Although generally described using piezoresistors, embodiments of the present invention can use the diaphragm deflection to provide other useful measurables. For example, capacitive elements can be used for sensing. In the case of capacitive elements, one of the plates of the capacitor comprises or is supported by the diaphragm. Sensing elements can also include light-based generally fiber optic-based sensors, such as photoelastic, intensity-based, or interferometric-based. In yet another embodiment, the sensing can be Doppler-based.

As known in the art, a typical pressure sensor structure comprises a diaphragm which is exposed to one pressure on one side and a control pressure on the other side. The flexing of the diaphragm is then measured and correlated to the pressure. As also known in the art, this type of sensor can be formed using conventional semiconductor (e.g. silicon) integrated circuit processing using etching techniques (e.g. plasma etching), with, as one example, piezoresistive elements formed generally at locations within the diaphragm via ion implantation. The piezoresistive elements will vary their resistance in accordance with the stress placed on the diaphragm, allowing measurement of the pressure with an electrical circuit. Alternately, in the case of capacitive sensing, a chip can be bonded to the top of the sensor and capacitive changes can be measured instead of piezoresistive changes.

As described above, volumetric flow sensors according to embodiments of the invention modify typical pressure sensor structures by adding at least one attached flow disrupting protruding feature on the stress sensitive diaphragm. In one embodiment a horizontal pressure gradient is created across the diaphragm producing a moment in the structure, described below relative to FIG. 3A. In an alternate embodiment a vertical pressure gradient is created by an airfoil producing a vertical force on the diaphragm, described below relative to FIG. 4A. In yet another embodiment, a pressure gradient is generated by a wedge shaped feature mechanically coupled to an outer surface of the stress sensitive diaphragm described below relative to FIG. 5.

Figure 1:
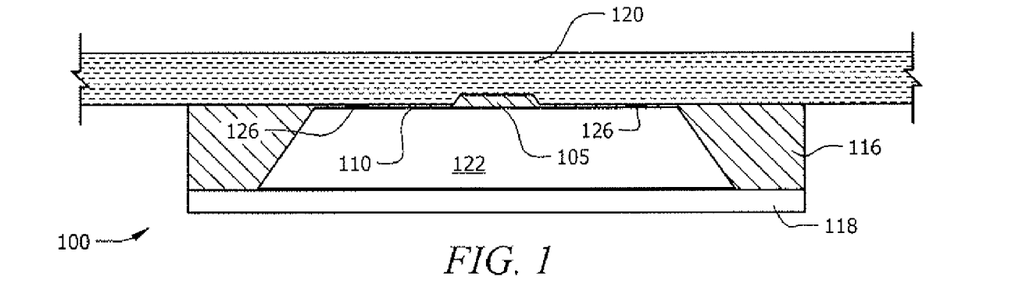
FIG. 1 shows a cross sectional view of a volumetric fluid flow sensor according to an embodiment of the invention having a flow disrupting feature comprising a bump mechanically coupled to an outer surface of a stress sensitive diaphragm, along with piezoresistive sensing resistors.

FIG. 1 shows a cross sectional view of a volumetric fluid flow sensor 100 according to an embodiment of the invention having a flow disrupting feature comprising a bump 105 mechanically coupled to or emerging from an outer surface of a stress sensitive-sensitive diaphragm 110. Stress sensitive diaphragms are conventionally used for pressure sensing, not for flow sensing according to embodiments of the invention. Diaphragm 110 is supported by a frame 116 which in one embodiment is formed from an integral substrate 118, and in another embodiment diaphragm 110 and frame 116 are disposed on another substrate (e.g. bonded to), generally referred to as a constraint substrate 118. Cavity region 122 is between diaphragm 110 and substrate 118. Flow channel 120 allows fluid to flow over diaphragm 110 and interact with bump 105 which experiences forces responsive to fluid flow. Flow channel 120 can comprise a tube has a length sufficient to extend beyond the area of diaphragm 110 in both the length and width dimension. The flow disrupting bump 105 delivers flow-induced stress signals directly to the pressure transducer diaphragm 110, and creates a pressure differential (gradient) along the diaphragm thereby imparting a moment or force on the diaphragm.

Figure 2:
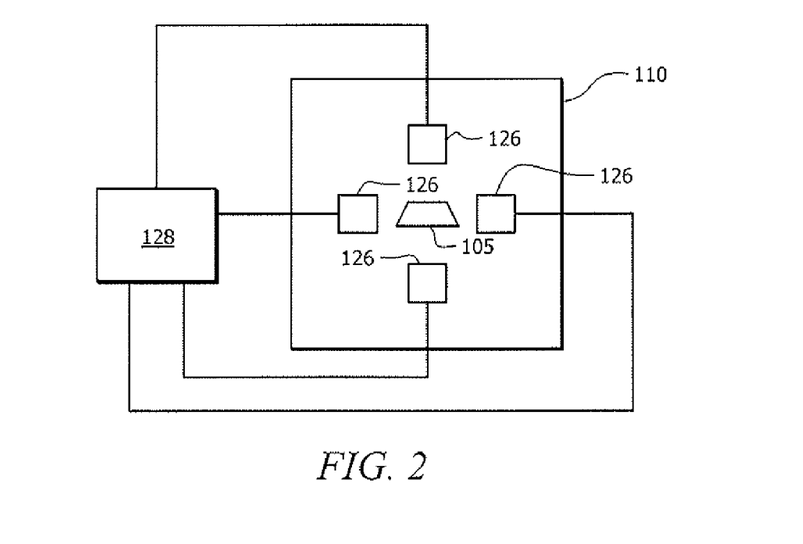
FIG. 2 illustrates a depiction of a sensing structure comprising 4 piezoresistive elements formed within the diaphragm, in a Wheatstone Bridge arrangement, which measure the pressure on the diaphragm. Also represented is signal processing circuitry, electrically connected to the piezoresistive elements.

Two piezoresistive sensing elements 126 are shown (2 other piezoresistive resistors normally present to form a Wheatstone Bridge are not shown) which are generally formed within the diaphragm 110, laterally placed from the bump 105, such as by ion implantation. The piezoresistive sensing elements 126 perform a transducer function by generating an electrical sensing signal responsive to a pressure signal received. As shown in FIG. 2 described below, signal detection circuitry 128 can be coupled to receive the electrical sensing signal or other sensing signal in the case of other sensing structures and is operable for determining a flow rate of the fluid from the sensing signal. Alternatively, volumetric fluid flow sensor 100 can simply provide a sensing signal, such as an electrical signal at bond pads connected to respective piezoresistive elements 126.

Diaphragm 110 generally has a thickness ranging from about 5 µm to about 30 µm. In some configurations the diaphragm is square shaped with linear dimensions ranging from 3 to 10 mm. Diaphragm 110 can be generally formed from materials including silicon (e.g. single crystal silicon, epitaxially grown silicon, polysilicon) and silicon nitride Flow disrupting features according to embodiments of the invention, such as bump 105 shown in FIG. 1, can be formed using several known techniques. As described above, flow disrupting features according to embodiments of the invention can comprise the same material as diaphragm 110, or can comprise a different material. For example, a "bump" of material can be deposited or micromachined on top of a pressure transducer diaphragm 110. Slab shaped flaps can be patterned and etched out of a variety of thin film materials, such as silicon nitride or silicon dioxide. Patternable polymers such as conventional photoresists, polyimides, and PMMA, can be use to form a smooth bump on a surface. Shapes formed from these materials can be altered by reflowing, such as by using thermal and optical (UV) methods. Glasses and other ceramics or metals can be applied to the diaphragm surface as a thick film through a silk screening process. These can be glazed in place or reflowed to give a desired shape. Another method is to directly modify the diaphragm material by plasma etching. Deep Reactive Ion Etching (DRIE) tool makers offer tools that can vary a plasma to micromachine lens shapes, which could serve as an available flow disrupting feature shape. Micro inkjet technology is also available to deposit bumps of material and microlenses. Techniques utilizing combinations of these manufacturing processes can be used to machine shapes out of the diaphragm material.

The flow disrupting feature 105 can comprise a variety of other shapes or a plurality of shapes. For example, an elongated tetrahedral shape can be used for improved performance. The dimensions of the flow disrupting feature can be varied. Generally, the dimensions are on the order of tens or hundreds of microns. In the case of a uniform bump, such as bump 105, in one embodiment the height is 70 µm, the and the length and width is approximately 300 µm. Other exemplary dimensions are provide in the Examples described below.

Substrate 118 can comprise a variety of substrates. For example, substrate 118 can comprise glass, quartz, silicon, or plastic.

FIG. 2 illustrates a depiction of 4 piezoresistive elements 126 within the diaphragm 110 including flow disrupting bump feature 105 for measuring the pressure differential. The piezoresistor elements 126 are shown connected to signal detection circuitry 128, such as ASIC-based circuitry. The Wheatstone Bridge could be configured, such as guided by simulation, both electrically and physically, for maximum response to the resulting stress gradient. Symmetrical stresses would then appear as a common mode signal, offering rejection to uniform pressure changes and symmetrical package induced stresses.

Figure 3A:
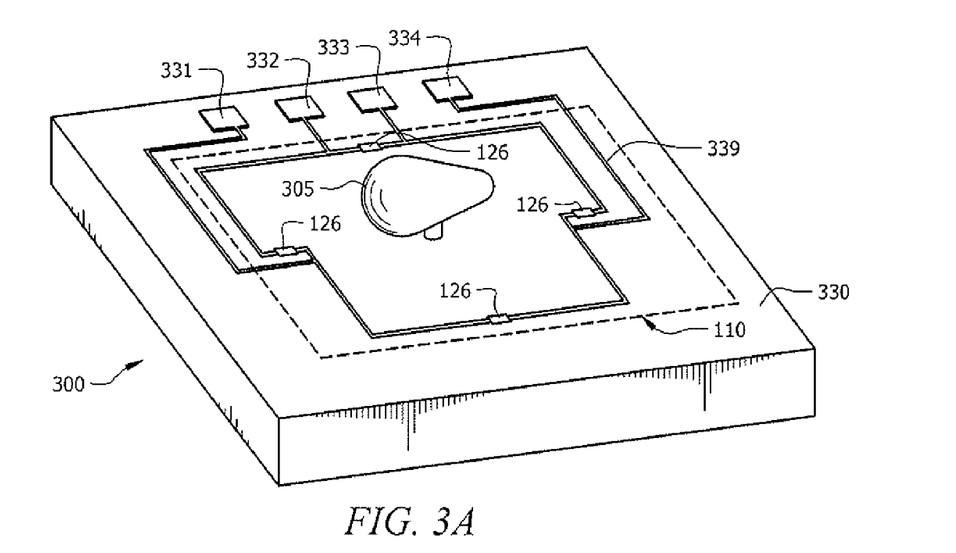
FIG. 3A is a top-side view of a volumetric fluid flow sensor according to an embodiment of the invention having a flow disrupting tear-drop shaped feature mechanically coupled to the outer surface of a stress sensitive diaphragm, along with bond pads coupled to the piezoresistors.

FIG. 3A is a top-side view of a volumetric fluid flow sensor 300 (flow channel not shown) according to an embodiment of the invention having a flow disrupting tear-drop shaped feature 305 mechanically coupled to the outer surface and near the center of a stress sensitive diaphragm 110. Piezoresistors 126 are formed within the diaphragm 110. Beyond the area of the diaphragm 110, is a relatively thick portion of the die 330 (e.g. 200 to 400 µm thick). Bond pads 331-334 are coupled to the piezoresistors 126 by the electrical traces 339 shown. In operation, fluid impinging on tear drop 305 applies a moment near the center of the diaphragm 110.

Figure 3B:
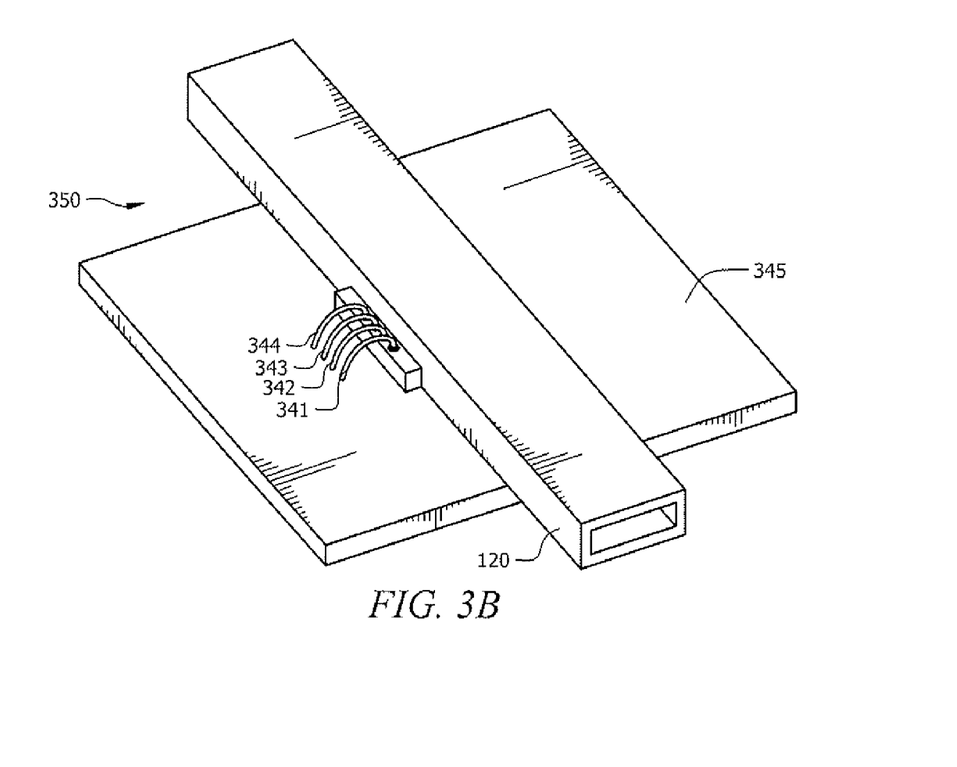
FIG. 3B is a top-side view of the volumetric fluid flow sensor shown in FIG. 3A partially assembled, with the wire bonds located outside the flow channel.

FIG. 3B is a top-side view of the volumetric fluid flow sensor shown in FIG. 3A assembled to include a flow channel 120 and a package 345 that together with flow channel surrounds sensor 300, shown as reference 350, according to an embodiment of the invention. The flow channel 120 extends beyond the diaphragm 110 shown in FIG. 3A, but does not extend to reach the bond pads 331-334. Bond wires 341-344 are shown for contacting bond pads 331-334 and coupling the signals provided to circuitry such as ASIC circuitry, within the package 345, for processing the sensor signal. The wire bonds 341-344 are outside the flow channel 120, which generally leads to enhanced reliability as compared to wire bonds which are conventionally inside the flow channel.

Figure 4A:
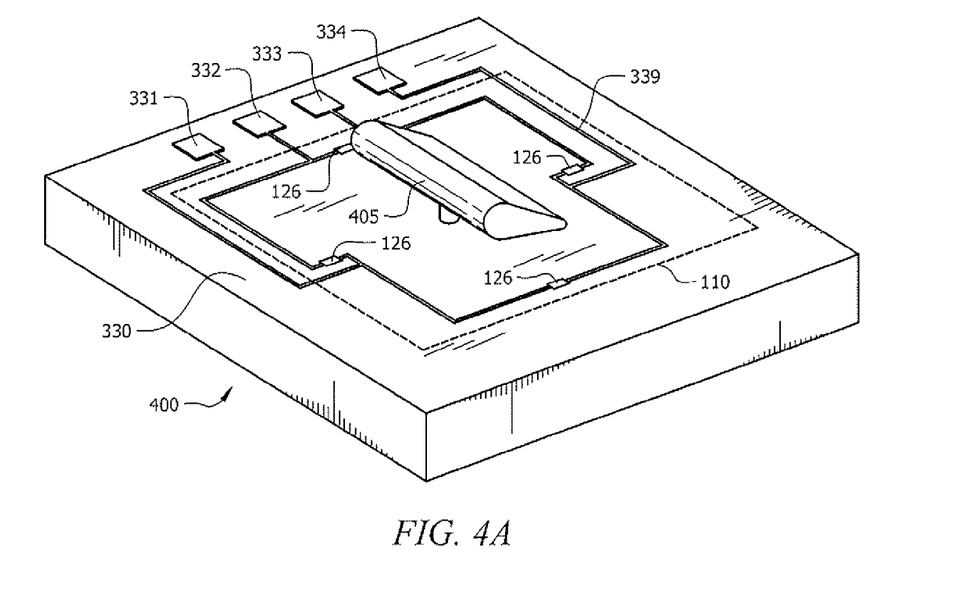
FIG. 4A is a top-side view of a volumetric fluid flow sensor according to an embodiment of the invention having a flow disrupting air-foil shaped feature mechanically coupled to the outer surface of a stress sensitive diaphragm, along with bond pads coupled to the piezoresistors.
Figure 4B:
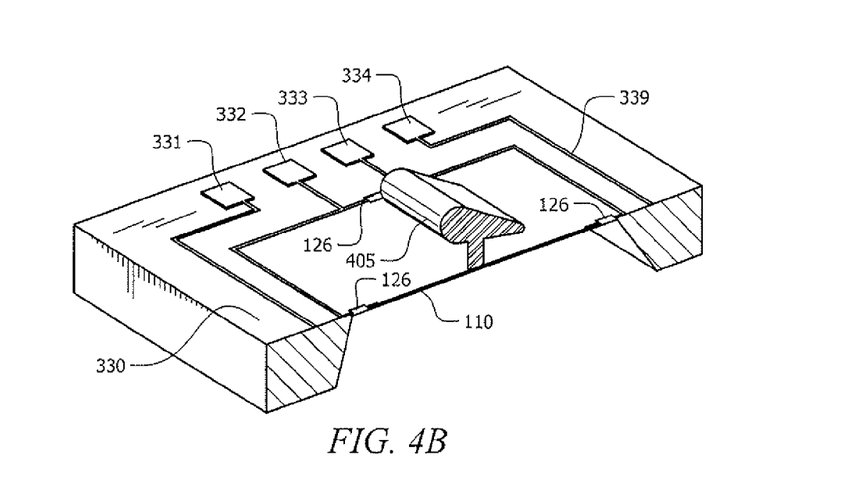
FIG. 4B is a cross sectional view of the sensor shown in FIG. 4A.

FIG. 4A is a top-side view of a volumetric fluid flow sensor 400 (flow channel not shown) according to an embodiment of the invention having a flow disrupting airfoil shaped feature 405 mechanically coupled to the outer surface near the center of a stress sensitive diaphragm 110. FIG. 4B is a cross sectional view of sensor 400 shown in FIG. 4A.

Figure 5:
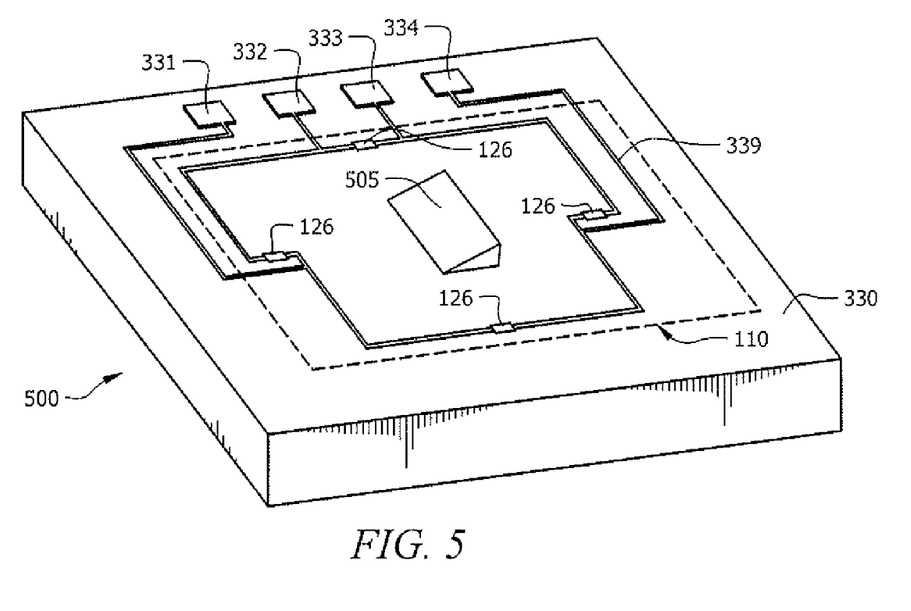
FIG. 5 is a top-side view of a volumetric fluid flow sensor according to an embodiment of the invention having a flow disrupting wedge-shaped feature mechanically coupled to the outer surface of a stress sensitive diaphragm, along with bond pads coupled to the piezoresistors.

FIG. 5 is a top-side view of a volumetric fluid flow sensor 500 according to an embodiment of the invention having a flow disrupting wedge-shaped feature 505 mechanically coupled to the outer surface of a stress sensitive diaphragm 110, along with bond pads 331-334 coupled to the piezoresistors 126. The fluid flow around the wedge 505 increases the pressure on the diaphragm 110 near the center of the diaphragm 110, and has shown improved performance as compared to a uniform slab or bump, such as bump 105 described above relative to flow sensor 100 in FIG. 1.

EXAMPLES

The examples provided below are non-limiting examples provided to only show particular embodiments of the present invention. Unless noted otherwise, the fluid was air and, the air flow was 1 m/sec, and the diaphragm was a silicon diaphragm 16 µm thick, and had a length and width of 1.7 mm. The sensing structure comprised piezoresistors. Simulations used Ansys software (Ansys, Inc. 275 Technology Drive Canonsburg, Pa. 15317. Reference data was generated by simulating air flow over a conventional flat diaphragm.

Figure 6A:
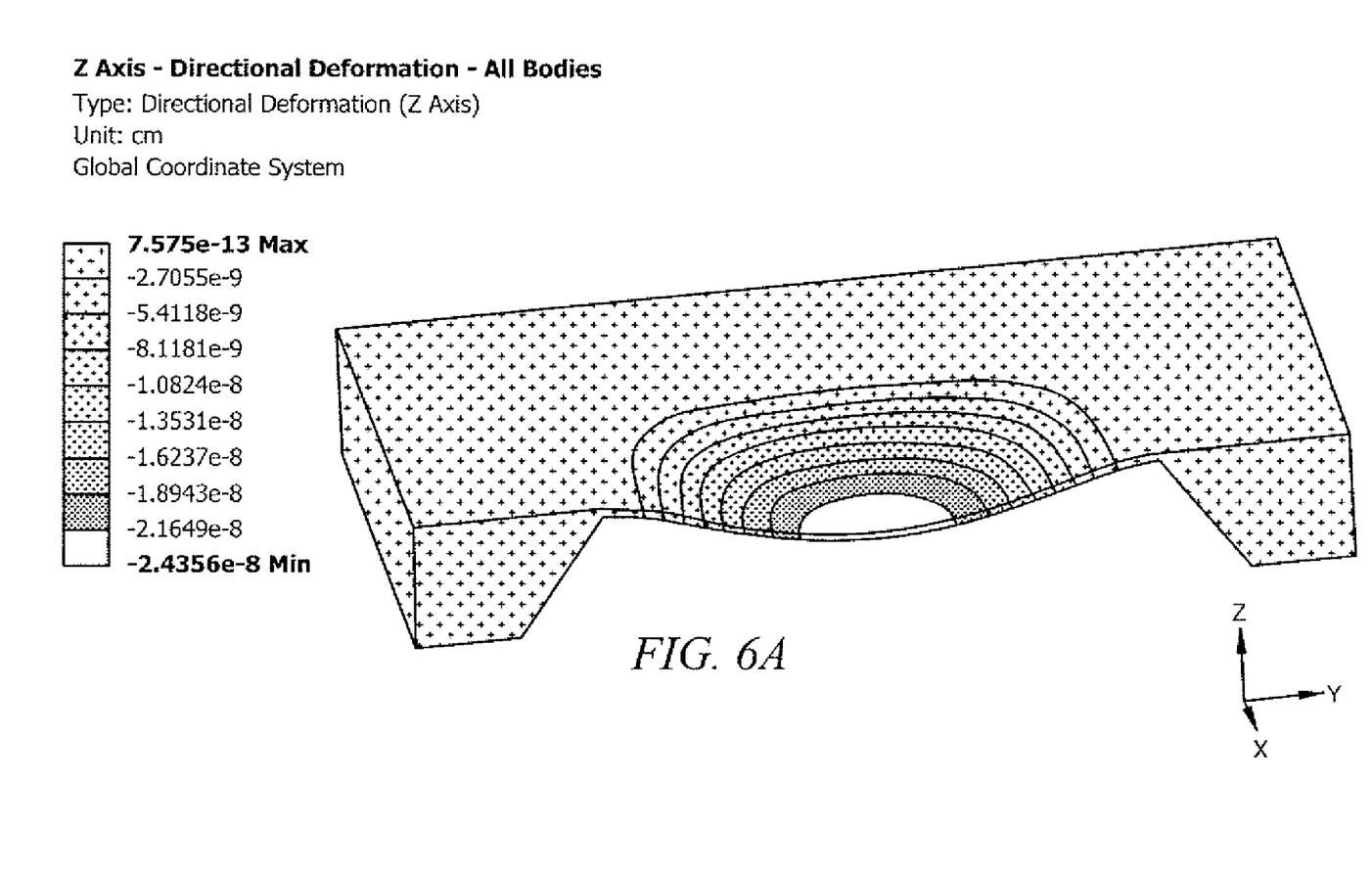
FIGS. 6A and B show the diaphragm deflection and Von Mises stress produced by an air flow, respectively.
Figure 6B:
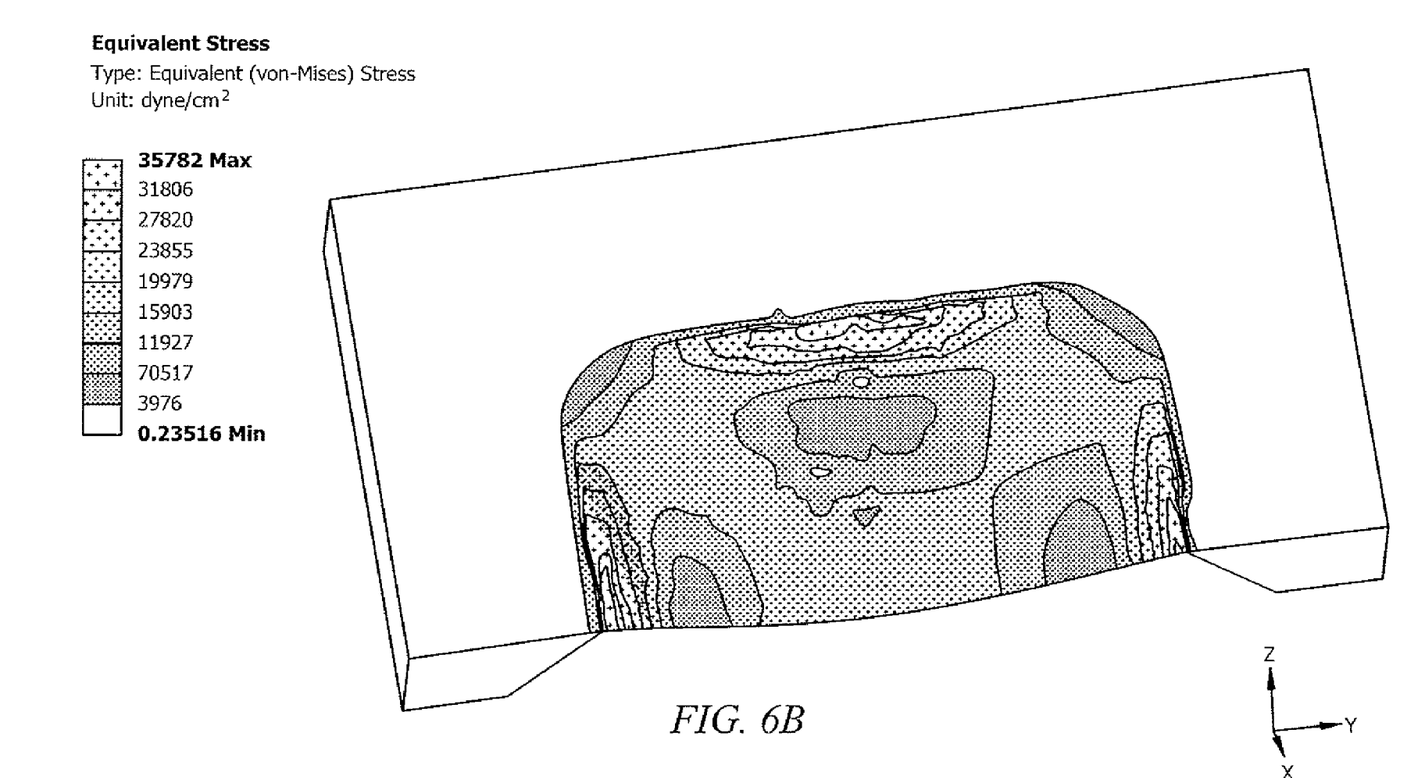
Figure 7A:
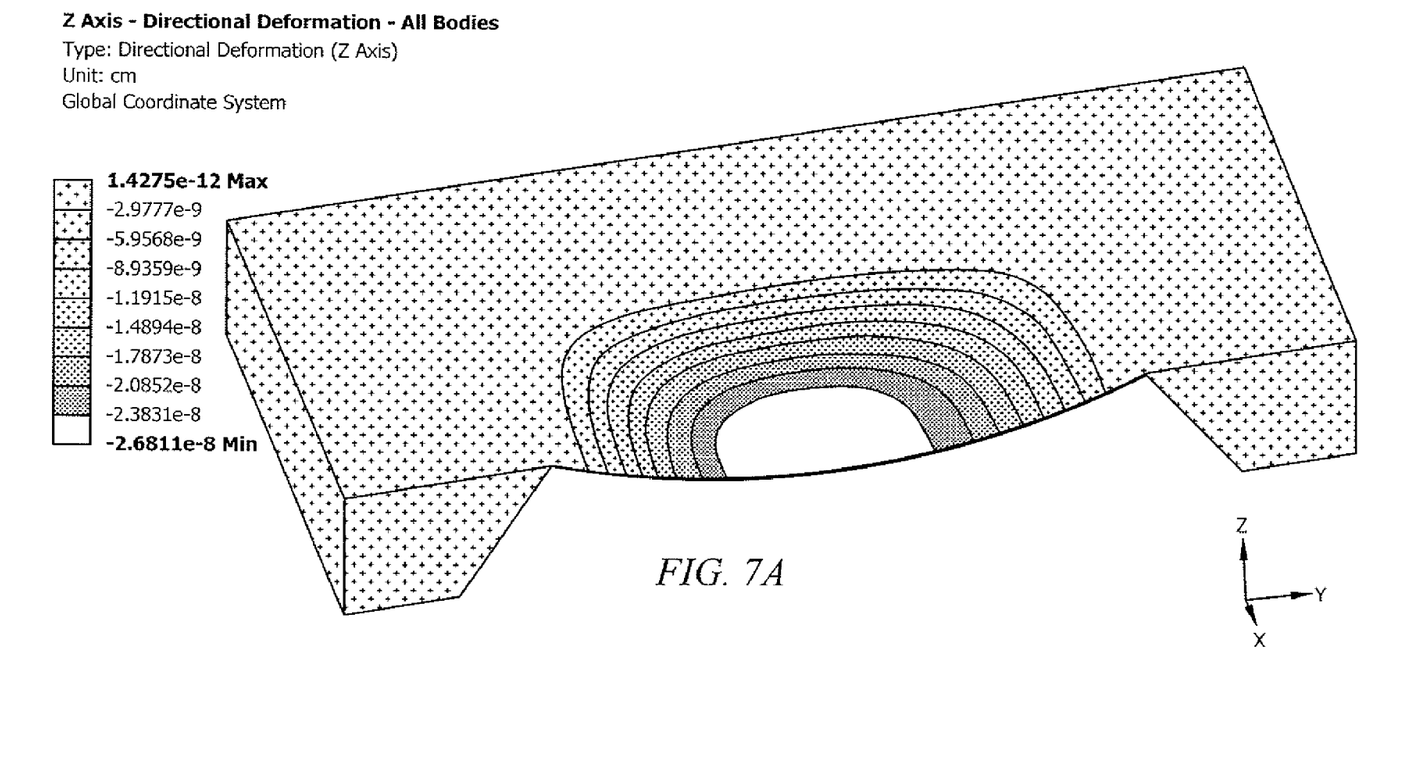
FIGS. 7A and B show the diaphragm deflection and Von Mises stress produced by the air flow over a diaphragm with a flow disrupting bump-shaped feature, according to an embodiment of the invention.
Figure 7B:
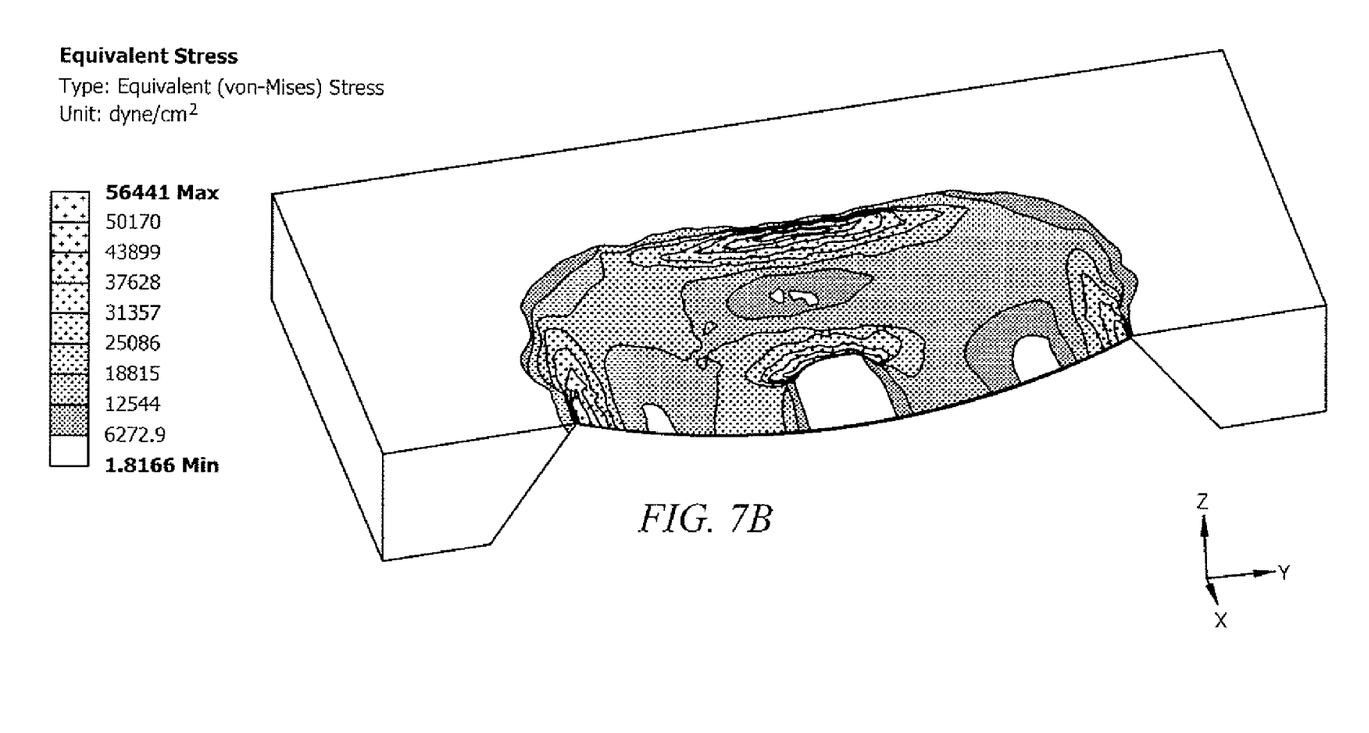

FIGS. 6A and B show the diaphragm deflection and Von Mises stress produced by the air flow, respectively. FIGS. 7A and B show the diaphragm deflection and Von Mises stress produced by the air flow over a diaphragm with a bump according to an embodiment of the invention. The dimensions of the bump were 600 µm width (in the flow direction), 250 µm length (perpendicular to the flow direction) and 100 µm height. The flow around the bump produces a larger pressure in this section of the diaphragm compared to the rest of the diaphragm. A larger pressure on the diaphragm increases the deflection on it and thereby increases the output signal. The bump on the diaphragm was found to increase the stresses on the diaphragm by 57.7% as compared to the conventional flat diaphragm. This extra stress was found to increase the sensor output signal by 44%.

Figure 8A:
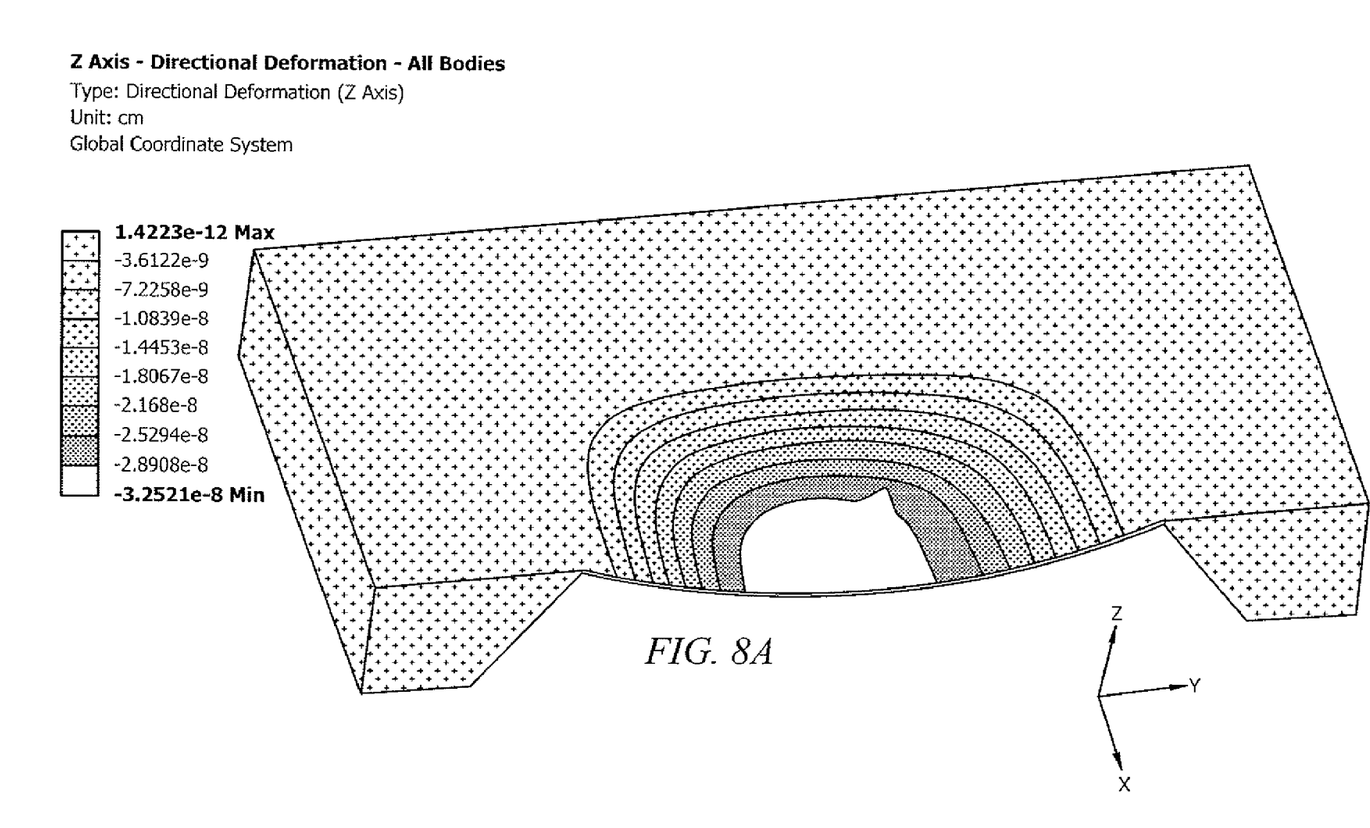
FIGS. 8A and B show the diaphragm deflection and Von Mises stress produced by the air flow over a diaphragm with a flow disrupting wedge-shaped feature, according to an embodiment of the invention.
Figure 8B:
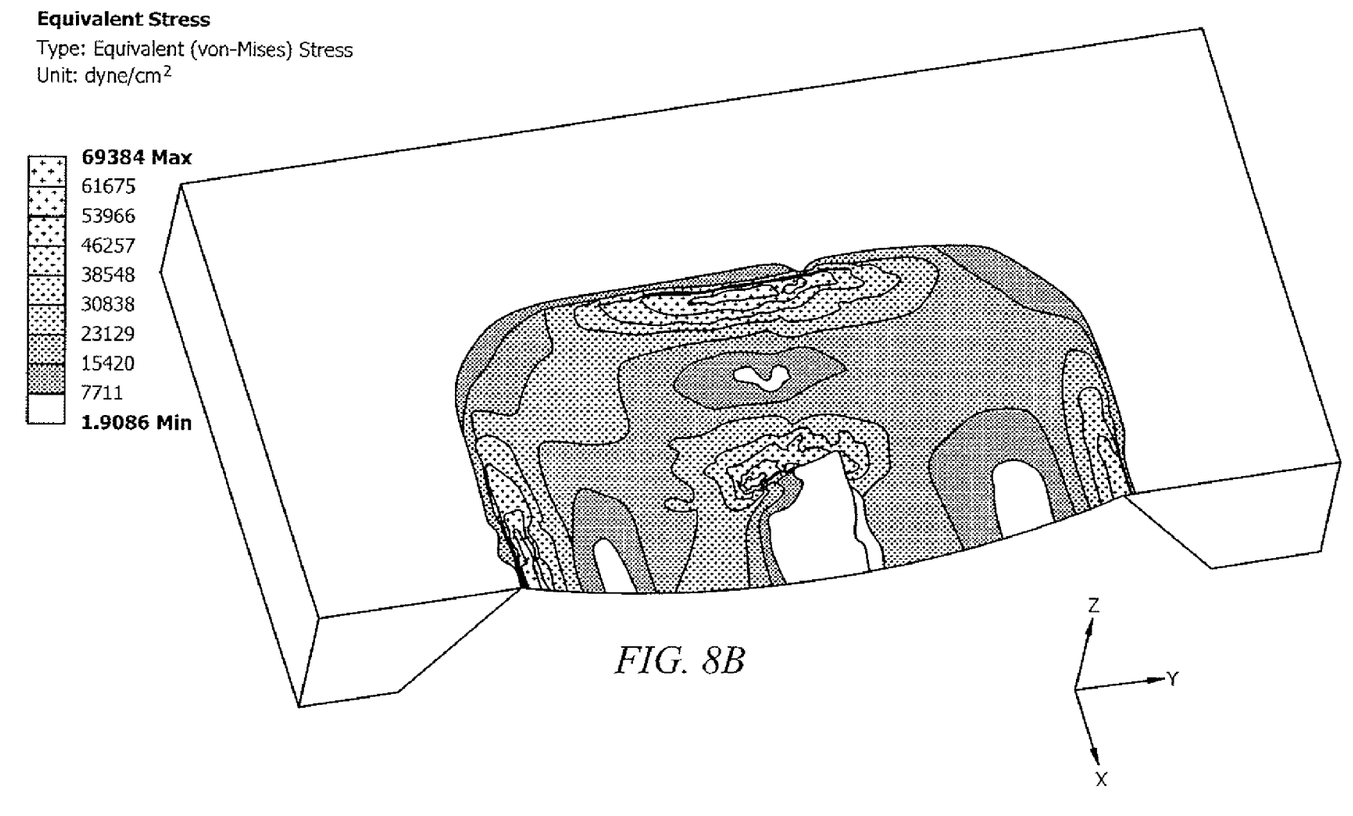

FIGS. 8A and B show the diaphragm deflection and Von Mises stress produced by the air flow over a diaphragm with a wedge, according to an embodiment of the invention. The dimensions of the wedge were 600 µm width (in the flow direction) 200 µm length (perpendicular to the flow direction) and a height linearly increasing from zero to 100 µm. The wedge was found to increase the diaphragm stress by 93.4% as compared to the conventional flat diaphragm. This extra stress was found to increase the sensor output signal by 66.5%.

The shape and dimensions of the diaphragm, flow disrupting feature and fluid channel can be modified to further increase the pressure sensor's output signal. Such modifications can be based on analysis and prototype testing which can be used to adjust the size and shape of the components to increase the output signal.

This invention can be embodied in other forms without departing from the spirit or essential attributes thereof and, accordingly, reference should be had to the following claims rather than the foregoing specification as indicating the scope of the invention.

In the preceding description, certain details are set forth in conjunction with the described embodiment of the present invention to provide a sufficient understanding of the invention. One skilled in the art will appreciate, however, that the invention may be practiced without these particular details. Furthermore, one skilled in the art will appreciate that the example embodiments described above do not limit the scope of the present invention and will also understand that various modifications, equivalents, and combinations of the disclosed embodiments and components of such embodiments are within the scope of the present invention.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A volumetric fluid flow sensor, comprising:
   a flow channel for flowing a fluid therein;
   a diaphragm having an outer surface within said flow channel, said diaphragm comprising at least one flow disrupting feature mechanically coupled to or emerging from said outer surface; and
   a sensing structure coupled to said diaphragm for generating a sensing signal responsive to a pressure signal on said diaphragm.

2. The flow sensor of claim 1, wherein said sensing structure comprises a plurality of piezoresistive elements.

3. The flow sensor of claim 1, wherein said sensing structure comprises a capacitive element.

4. The flow sensor of claim 1, further comprising a substrate for supporting said flow sensor, wherein said diaphragm is formed from said substrate and said flow sensor is a monolithic device.

5. The flow sensor of claim 4, wherein said substrate comprises silicon or glass.

6. The flow sensor of claim 1, wherein said flow disrupting feature comprises a wedge.

7. The flow sensor of claim 1, wherein said flow disrupting feature comprises a moment generating geometry.

8. The flow sensor of claim 1, wherein said diaphragm and said flow disrupting feature are formed from different materials.

9. The flow sensor of claim 1, further comprising signal detection circuitry coupled to receive said sensing signal operable for determining a flow rate of said fluid from said sensing signal.

10. The flow sensor of claim 1, wherein said sensing structure comprises a plurality of piezoresistive elements, further comprising a plurality of bond pads coupled to each of said plurality of piezoresistive elements, wherein said plurality of bond pads are outside said flow channel.

11. A method for sensing a volumetric flow of a fluid, comprising:
    flowing a fluid over a diaphragm having an outer surface within a flow channel, wherein said diaphragm comprises at least one flow disrupting feature mechanically coupled to or emerging from said outer surface;
    generating a sensing signal responsive to a pressure signal from a portion of said diaphragm, and
    determining a flow rate of said fluid from said sensing signal.

12. The method of claim 11, wherein said sensing signal is an electrical signal provided by a piezoresistive sensing structure.

13. The method of claim 11, wherein said flow disrupting feature partially obstructs a flow of said fluid to create a pressure differential between opposite sides of said diaphragm, along a direction of said flow.

14. The method of claim 11, wherein said flow disrupting feature deflects said flow of said fluid to produce a force on said diaphragm.

* * * * *